United States Patent
Dadd et al.

[11] Patent Number: 6,063,129
[45] Date of Patent: May 16, 2000

[54] MEANS AND METHOD FOR SYSTEM PERFORMANCE TRACKING

[75] Inventors: Graham John Dadd; Arthur Edwin Sutton, both of Hampshire, United Kingdom

[73] Assignee: The Secretary of State for Defence in Her Britannic Majesty's Government of the United Kingdom of Great Britain and Northern Ireland, Farnborough, United Kingdom

[21] Appl. No.: 09/017,806

[22] Filed: Feb. 3, 1998

[30] Foreign Application Priority Data

Feb. 4, 1997 [GB] United Kingdom .................. 9702268

[51] Int. Cl.$^7$ .............................. G06G 7/48; G06F 7/60
[52] U.S. Cl. ................................. 703/7; 703/2; 700/29; 700/32
[58] Field of Search ............... 395/500, 500.23, 395/500.24, 500.28; 364/578, 149; 700/29, 32

[56] References Cited

U.S. PATENT DOCUMENTS

| 5,094,127 | 3/1992 | Ishida et al. ........................ 477/108 |
| 5,519,605 | 5/1996 | Cawlfield ............................ 364/151 |
| 5,777,872 | 7/1998 | He .................................. 364/149 |

FOREIGN PATENT DOCUMENTS

| 0507320 A2 | 4/1992 | European Pat. Off. . |
| 1273096 | 5/1972 | United Kingdom . |
| 2120405A | 11/1983 | United Kingdom . |
| 2161628A | 1/1986 | United Kingdom . |
| WO 93/25953 | 12/1993 | WIPO . |

OTHER PUBLICATIONS

Lambert, "A Simulation Study of Turbofan Engine Deterioration Estimation Using Kalman Filtering Techniques", NASA Technical Memorandum 104233, National Aeronautics and Space Administration.

Orme et al, "Subsonic Flight Evaluation of a Propulsion System Parameter Estimation Process for the F100 Engine", published by the American Institute of Aeronatuics and Astronautics AIAA–92–3745.

*Primary Examiner*—Kevin J. Teska
*Assistant Examiner*—Samuel Broda
*Attorney, Agent, or Firm*—Nixon & Vanderhye P.C.

[57] ABSTRACT

A method of tracking a system (1) having sensors (3) (e.g. gas turbine engines) by providing a computer model (4) which, from changes in sensor readings, can track (follow) changes in performance parameters of the system. These may be e.g. efficiencies of various of components such as compressors and turbines. In the common embodiment, the method used (Singular Value Decomposition) is a way of computing the most likely solution when there are more performance parameters than the number of sensors used and thus a degree of redundancy. The method allows system diagnosis and most importantly a tracked model allows the selection of a tailored control regime (9) which results in optimum efficiency for the individual system (engine).

9 Claims, 3 Drawing Sheets

MEANS AND METHOD FOR SYSTEM PERFORMANCE TRACKING

BACKGROUND OF THE INVENTION

1. Field of the Invention

The invention relates to a method of system performance tracking by providing a computer model (simulation) of a system having measurement sensors whereby the model can track, or follow, changes which occur in the performance of the system in real-time; these models are sometimes referred to as real-time or tracking models. The invention also relates to a method of tracking a system. It is in particular concerned with providing a tracking model of a gas turbine engine which can track the degradation and performance changes thereof, and although this specification refers mainly to tracking the performance of gas turbine engines, it should be understood that such a tracking model may be provided for any system which incorporates measurement sensors, and is not exclusively applicable to gas turbine engines. Such tracking models have practical use as tools in obtaining optimum performance of the engines, whereby varying control regimes can be applied to the model such that the control regime which provides optimum performance is determined. The optimum control regime can then be applied to the actual engine itself. In other words, depending on the state of the engine in terms of its performance (degradation), the optimum control regime for pre-set operating demand criteria will vary; if a model is provided which tracks the actual system then it may be used to obtain the optimum control regime as performance changes. Such tracking models also have application in engine health diagnosis and maintenance by allowing the performance of components of the engine to be assessed.

2. Discussion of Prior Art

Conventional engine controllers are designed on the assumption that all engines of a given type are represented by a 'fixed' or 'standard' engine. Often a fixed computer model of this standard engine is used to determine a control regime which achieves a number of guaranteed performance criteria. The controller is therefore designed for this fixed model, whose performance characteristics are assumed not to vary with time.

The performance of every engine however, is different because of, for example, build differences and tolerance variations in each individual engine. Additionally, as an engine ages, its performance degrades causing performance measures such as specific fuel consumption to decline. Engine deterioration through wear and damage therefore causes each engine to change in a time varying sense. Another source of time-dependant performance change is heat soakage (rematching of the engine due to thermal change of blade tip and seal clearances) which affects compressor and turbine efficiencies (these latter effects are reversible). Inevitably therefore, a number of compromises have to be made when designing controllers for a fixed model of gas turbine engine. Although the modelling differences between the actual engine and the fixed model tend to be small, they are significant; these small difference will lead to significant losses, e.g. in fuel consumption, when used to determine optimum control; corresponding gains can therefore be made if optimum control is obtained for the individual engine.

It is therefore advantageous if a suitable engine controller can use information pertaining to engine variation during the engine's operating life to obtain optimum performance levels by choice of suitable engine control data. It is estimated that control optimisation using a varying model, depending on applied demands, would enable a benefit in e.g. specific fuel consumption in the order of a 0.5–1% reduction, and a 17° C. benefit in reduction of hot end temperature. Gains of this scale would be costly and hard won through other developmental approaches such as improved turbomachinery design. In fact, additional control and heat management system complexity for improvements in specific fuel consumption as small as 0.1%, are not uncommon on large civil aero-engines.

As far as optimisation of performance is concerned, the conventional control mode in which the engine is operating is normally fixed and represents a compromise between economic operation, performance and engine life. For example, for an aircraft when cruising at altitude it is known to be desirable to reduce either fuel burn, for economy, or turbine temperature so as to conserve engine life; but the inflexibility of conventional controllers will inhibit this.

It is known that models which track actual engine performance are useful in providing an optimising control strategy. Such systems are described in the paper "Subsonic Flight Test Evaluation of a Propulsion System Parameter Estimation Process for the F100 Engine" by J S Orme et al, published by the American Institute of Aeronautics and Astronautics AIAA-92-3745, and in NASA technical memorandum 104233 "A Simulation Study of Turbofan Engine Deterioration Estimation Techniques Using Kalman Filtering Techniques" by H. H. Lambert. The optimisation described therein is performed on a computer model of the engine and not on the engine itself. The aim of these tracking models is to use changes in sensor readings obtained from the engine at particular operating points to estimate changes in engine component performance; i.e. to calculate so called "deterioration parameters", which are also alternatively and hereinafter referred to as "performance parameters". These such parameters are, for example, efficiencies or flow capacities of turbines or compressors. Changes in performance parameters when incorporated into a computer model take the form of correction terms which when input to such models should result in computation of identical model sensor output changes as those readings from the actual engine at a particular operating point. When this is achieved the model is said to match or track the engine successfully. The model is usually a real-time thermodynamic model of the engine which typically, in addition to the normnal parameters such as fuel, guide vane and nozzle actuator positions, incorporates a further set of variables which represent these performance parameter changes.

The choice of the engine sensor outputs which the model uses to track is very important, they should give a broad measure of the condition of the engine so that when both sets of engine and model outputs are equal there is a reasonable level of confidence that the model is a good representation of the engine. This means that the sensors used must be widely distributed in terms of their independence.

Tracked models can be exploited practically to obtain control data which will maintain optimal efficiency for a certain required performance e.g. specific fuel consumption. In addition, a knowledge of the change in performance parameters is useful in monitoring degradation of components and to investigate suitable maintenance action.

The success of the model used for optimisation is crucially dependent on how well the model matches the engine since, as mentioned, the performance of every engine is different because of manufacturing tolerances, and will in any case deteriorate throughout the engine's operational life.

Engine performance parameters are not directly measurable with engine control instrumentation but changes in their value can be estimated using prior knowledge of how such changes thereof affect changes in engine sensor outputs at a particular operating point. In mathematical terms, variations in the set (or vector) of engine performance parameters which may occur (hereinafter denoted as dP, gives rise to changes in the set (or vector) of engine sensor outputs (hereinafter denoted as dx), when control demand inputs to the engine are constant, i.e. at a particular operating condition. It is assumed that dP and dx are related linearly at a given engine operating point by a matrix of sensitivity coefficients C, such that:

dx=CdP dx contains m elements, m being the number of sensors used by the model, dP contains n elements, n being the number of performance parameters under consideration, C is a matrix of real numbers with m rows and n columns.

NASA Technical Memorandum 104233 describes turbofan engine deterioration estimation by providing a tracking model of the engine which uses Kalman filtering techniques to determine dP from dx. There is a significant problem with this technique in that the tracking can only be performed if there are as many sensors used as performance parameters to be estimated i.e. if m=n. This forces various assumptions to be made, and results in the tracking not being exact. It is often the case that the number of performance parameters liable to measurable variation exceeds the number of sensors. A given set of changes in the sensor outputs of the engine at a particular operating condition could be accounted for by a variety of different performance parameter changes.

SUMMARY OF THE INVENTION

Although there may be no unique solution for the performance parameter variations causing a particular set of sensor variations, there is a component which is common to all possible solutions; the shortest component in vector space. The inventors have determined that this component gives the most likely and accurate solution. This is obtained by calculating a "pseudoinverse" of C which when obtained, allows the most accurate dP estimate to be obtained, denoted dPe.

It is an object of the present invention to provide a method of tracking the performance of a system, which allows performance parameters to be ascertained accurately, and further without the need for the number of sensors used by the tracking method equal to the number of performance parameters.

The invention consists of a model of a system having input from one or more sensors of said system and having means to relate the vector of changes in performance parameters of said system dP, to the vector of sensor output changes dx, where the vectors are of different dimensions, and to determine that component of performance parameter changes which is common to all possible solutions and using this to determine performance parameters.

The invention also comprises a method of tracking a system having sensors, comprising the steps of:

a) providing a real time model having input from one or more of said sensors;

b) storing at least one non-square coefficient matrix C relating sensor changes to performance parameter changes; and c) calculating a pseudoinverse of matrix C, where dx=C dP, where dx is the vector of system sensor changes and dP is the vector of performance parameter changes.

b) from step (c) determining changes in performance parameters.

The pseudoinverse of C is preferably calculated using a matrix method incorporating the technique of Singular Value Decomposition (SVD), which is a mathematical process used to analyse systems of linear simultaneous equations, and will be described in more detail hereinafter.

BRIEF DESCRIPTION OF THE DRAWINGS

By way of example an embodiment of the invention will hereinafter be described with reference of the drawings of which.

DETAILED DISCUSSION OF PREFERRED EMBODIMENT

Figure 1:
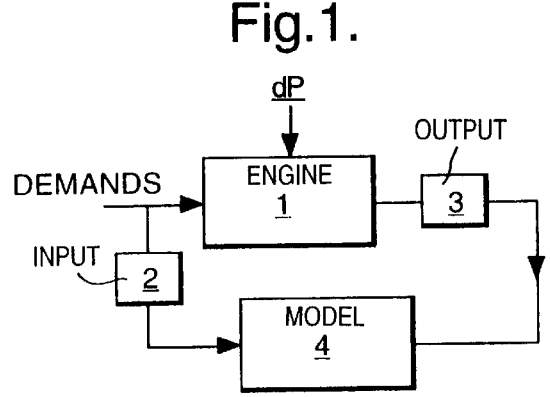
FIG. 1 shows a block diagram of the tracking system for a gas turbine engine incorporating a tracking model.

FIG. 1 shows a schematic figure of the tracking process used to track the characteristics of a gas turbine engine (1). A thermodynamic model (4) is provided which is designed to track the aero-engine. Input to the model are the values of the engine demand parameters from input demand parameter sensors (2). These represent the engine control inputs and engine operating environment parameters; table 1 below shows a list of these parameters which are equivalent for both engine and model.

TABLE 1

Input demand parameters

| Variable | Description |
|---|---|
| wfdm | Fuel supplied to the engine |
| gvdm | Engine inlet guide vane position |
| sndm | Engine nozzle actuator position |
| hpbodm | HP blow-off valve position |
| ptl | Total pressure at engine inlet |
| ttl | Total temperature at engine inlet |
| pso | Ambient pressure |

Output from the engine are a number of further sensor outputs $x_l$ to $x_n$ where n is the number of output sensors (3), and these are also input to the model. The selection of engine sensor outputs used by the model in this example uses existing engine control sensor ensuring the minimum cost and complexity. The sensor outputs considered to cover all measurements necessary to track the engine in this example are given in Table 2.

TABLE 2

Output sensors

| Parameter | Description |
|---|---|
| nh | high pressure spool speed |
| nl | high pressure spool speed |
| PS | low pressure compressor static pressure |
| PS21 | by pass static pressure |

TABLE 2-continued

Output sensors

| Parameter | Description |
| --- | --- |
| P21 | by pass total pressure |
| P3 | compressor outlet pressure |
| lpsot | low pressure stator outlet temperature |

The discrepancies that would occur between the engine and a fixed model are due to differences in performance parameters. It is the object of the tracking model to ascertain these changes in performance parameters. Performance parameters such as efficiency and flow capacity are shown in the following Table 3 and are grouped to relate to specific areas of the engine. In any system they should be sufficient in number to establish the principles of a tracking model.

TABLE 3

Engine performance parameters (degradation)

| Variable | Description |
| --- | --- |
| $e_{LPCI}$ | Increment in efficiency of lp compressor (inner) |
| $e_{LPCO}$ | Increment in efficiency of lp compressor (outer) |
| $e_{HPC}$ | Increment in efficiency of hp compressor |
| $e_{HPT}$ | Increment in efficiency of hp turbine |
| $e_{LPT}$ | Increment in efficiency of lp turbine |
| $f_{LPCI}$ | Increment in flow capacity of lp compressor (inner) |
| $f_{LPCO}$ | Increment in flow capacity of lp compressor (outer) |
| $f_{HPC}$ | Increment in flow capacity of hp compressor |
| $f_{HPT}$ | Increment in flow capacity of hp turbine |
| $f_{LPT}$ | Increment in flow capacity of lp turbine |

As described by equation 1, the output sensor change vector dx, and performance parameter change vector, dP are linearly related by the matrix C. C is likely to be functionally dependant on the engine operating point i.e. the effects of changes in performance parameters on sensor outputs depend on the particular operating condition and have to be determined in advance. This will be explained toward the end of the specification.

Figure 2:
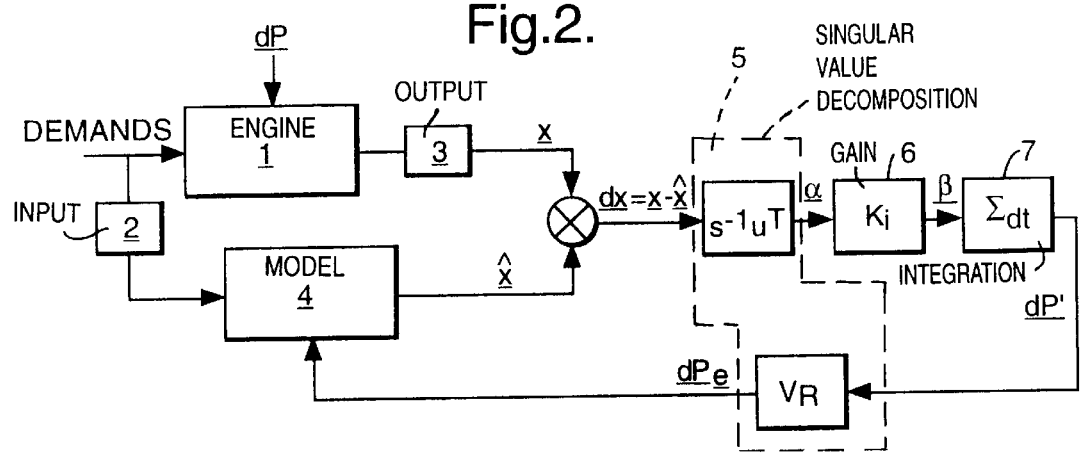
FIG. 2 shows an expanded representation of FIG. 1 to show more detail of the tracking model.

The number of performance parameters n exceeds the number of sensors m, and equation 1 has no unique inverse. In other words, more than one set of performance parameter changes can be found which results in a particular set of output sensor changes. In order to determine the component which is common to all possible solutions and which gives the most accurate estimate, the pseudoinverse of C has to be found. As is shown by FIG. 2, the tracking model stores previous sensor readings x (at a particular operating point) and computes differences from previous engine output sensor readings stored by the model, x and the current engine output sensor readings x to give the difference vector dx. This vector of sensor differences (or changes), dx undergoes three separate mathematical processes as shown. These are the Singular Value Decomposition (5), gain by factor K, (6) and signal integration with respect to time (7). Singular Value Decomposition (SVD) enables approximation of a vector of engine performance variation elements, dP, to be obtained from a vector of engine output sensor changes output differences, dx. Singles Value Decomposition manages the redundancy in computing dP so as to calculate a "pseudoinverse" of matrix C.

Singular Value Decomposition is a mathematical process which is applied to linear simultaneous equations represented by equation 1, the exploitation of which enables accurate tracking to be achieved by accurately computing dP. The matrix C first undergoes decomposition. The Singular Value Decomposition for C is as follows:

$$C_{mxn} = U_{mxm} S^S_{mxm} : 0_{mx(n-m)} V^T_{nxn}$$

Where U is a real mxm unitary matrix (representing a multidimensional axis transformation), the columns of which form an orthogonal basis for the m dimensional sensor space of C. Each of the columns is also scaled so that it has unit length and $UU^T = I_m$. V is an nxn unitary matrix (representing another multidimensional axis transformation) and the columns of the V matrix form an orthonormal basis for the n dimensional degradation vector and $VV^T = I_n$ and $S^S$ is an mxm positive, real, diagonal matrix with elements arranged in monotonically descending order (representing a set of scaling factors), i.e.

$$S^S = \begin{bmatrix} S1 & 0 & 0 & 0 & \\ 0 & S2 & 0 & 0 & \\ 0 & 0 & S3 & 0 & \\ 0 & 0 & 0 & S4 & \\ \vdots & & & & \\ 0 & 0 & 0 & 0 & \ldots & Sm \end{bmatrix}$$

where $S1 \geq S2 \geq S3 > S_{n-1} > S_n > 0$ and are the singular values. The matrix S is defined as $[S^S : 0]^{-1}$ i.e. the $S^S$ matrix packed with zeros in order to fill it to dimension of mxn. i.e.

$$\begin{bmatrix} S1 & 0 & 0 & 0 & & 0 & 0 \\ 0 & S2 & 0 & 0 & & 0 & 0 \\ 0 & 0 & S3 & 0 & & 0 & 0 \\ 0 & 0 & 0 & S4 & & 0 & 0 \\ \vdots & & & & & & \\ 0 & 0 & 0 & 0 & \ldots Sm & 0 & 0 \end{bmatrix}$$

This decomposition can be performed using computer mathematical packages. $dP_e$, the vector of least magnitude which will produce the observed changes in the sensor outputs dx is given by $$dPe = V_R (S^S)^{-1} U^T dx$$

where $V_R$ is the left part of matrix V partitioned between the m th and (m+1) th columns (the part of V which defines the range space). The above explains the origins of S, U, and $V_R$ in the tracking compensator shown in FIG. 1. This defines the process of Singular Value Decomposition and any reference to it hereinafter should be interpreted as such. Further reference to SVD is "Numerical recipes—the art of scientific computing" by W H Press, B P Flannery, S A Teukolsky and W T Vetterling, Cambridge University Press, 1990.

As mentioned beforehand, data pertaining to matrix C must be determined in advance and stored for use by the tracking model. This is done in the example by providing a thermodynamic computer simulation of the engine, which allows performance parameters to be varied or manipulated at will, and the consequential changes in output sensor readings are recorded. The simulation is run at a certain operating condition (matrix C will vary depending on operating point) and the steady state measurement response is recorded; changes in performance parameters (dP) are introduced one at a time on the simulation, and changes (dx) in simulation output sensor readings are recorded. The collection of this data is processed by mathematical computer packages and computation of C obtained by performing the division of sensor output vector changes (dx) by performance parameter vector changes (dP).

In addition to the Singular Value Decomposition, the tracking compensator contains m integrators and associated gains K (one for each output sensor) which are used to achieve their final value when processing dx, as to achieve the final value of dP more quickly. The integrator and gains are not essential for the invention and may be omitted.

The following describes two tests which demonstrates the effectiveness of the tracking model according to the invention. The apparatus is as shown in FIG. 1 except that a instead of using an actual engine a thermodynamic simulation was used instead. Unlike a real engine, the thermodynamic simulation of the engine allowed input performance parameters to be changed at will, resulting in sensor output changes, the latter of which were used by the tracking model to compute (or estimate) performance parameter changes which have occurred, thus enabling the accuracy of the tracking model to be judged. The thermodynamic simulation acts essentially as a real engine and in order to prevent confusion with the tracking model will be referred hereinafter to as the engine.

EXAMPLE 1

Demonstration of Tracking at a C Design Point

Both engine and model were set up at a particular operating condition (n1=79.5%). C and the U,S, and VR matrices resulting from its Singular Value Decomposition were computed beforehand at this same operating condition, the matrices being manually fixed in the tracking subroutine. An arbitrarily chosen dP vector of performance parameter changes which was presented to the engine is given in the second column of Table 4. The tracking model was left to run and the final values of dPe calculated and shown in the final column of the table gives a numerical comparison between the input performance parameter changes to the engine and final values computed by the tracking model.

TABLE 4

| Parameter | Set elements of dP set in engine | Final values of $dP_e$ calculated by tracking system |
| --- | --- | --- |
| $e_{HPC}$ | −0.01 | −0.0147 |
| $e_{HPT}$ | −0.01 | −0.0178 |
| $e_{LPT}$ | 0.0 | −0.0031 |
| $e_{HPT}$ | 0.0 | 0.0053 |
| $e_{LPT}$ | 0 | 0.0033 |
| $f_{LPCI}$ | −0.02 | −0.0195 |
| $f_{LPCO}$ | −0.03 | 0.00006 |
| $f_{HPC}$ | −0.025 | −0.0135 |
| $f_{HPT}$ | −0.02 | −0.0185 |
| $f_{LPT}$ | 0 | −0.0047 |

Figure 3:
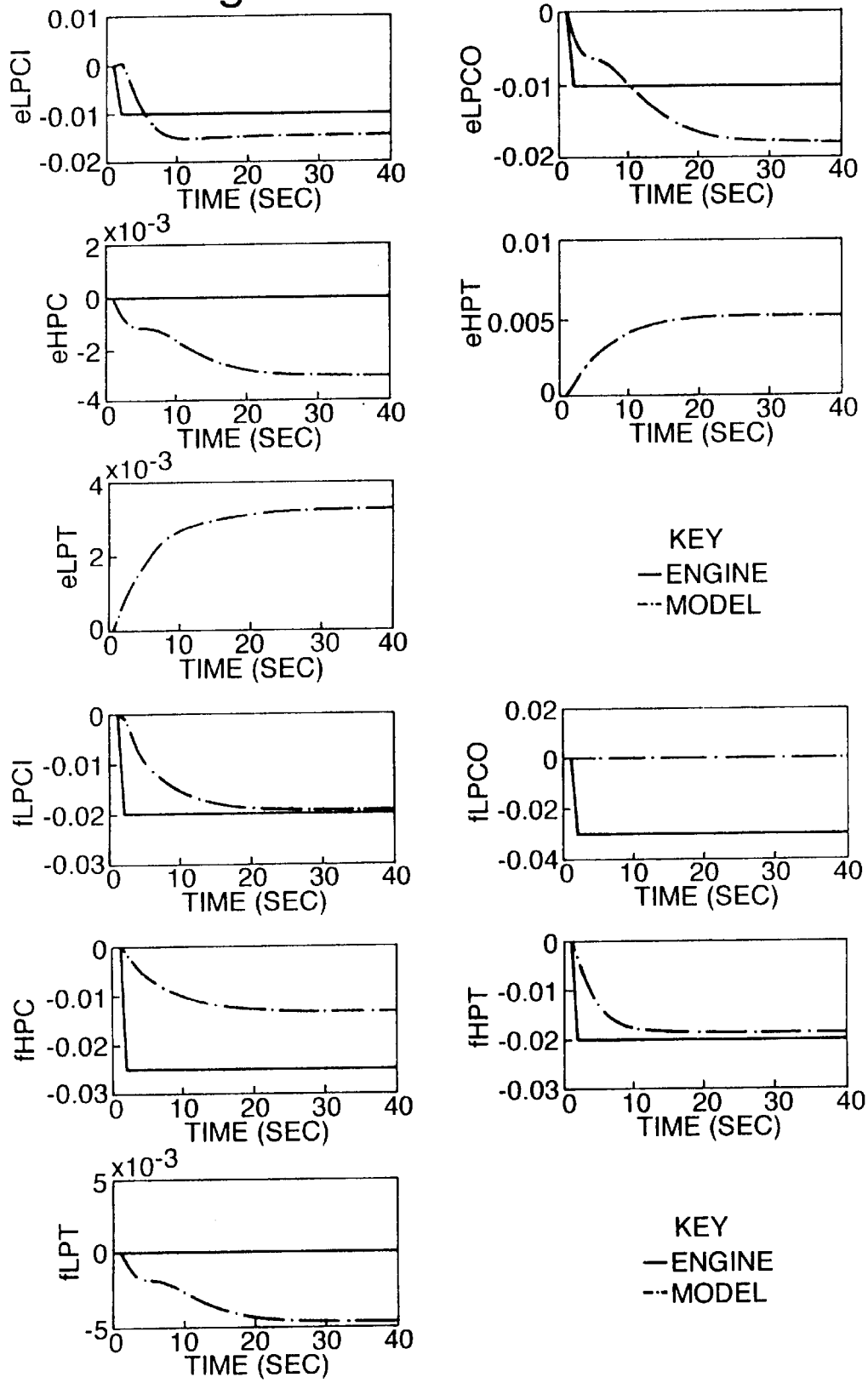
FIG. 3 shows graphs of the time response in determining performance parameters obtained in tests.

The results of the tracking are also shown in FIG. 3, showing the time response of the tracking process. The step in engine degradation occurred 2 seconds after the start of recording. The computed values of performance parameters reach a steady state within 20 seconds.

The results show that the elements of dPe, the estimates performance parameter changes, are respectable estimates of degradation and certainly sufficient to be indicative of damage or thermal non-equilibrium (e.g. $e_{LPCI}$ and $e_{LPCO}$). Singular Value Decomposition therefore allows successful quantification of degradation components from a given set of sensors.

EXAMPLE 2

Demonstration of Tracking at Non C Design Point,

A second test is hereinafter described to demonstrate a tracking of the model at an engine operating point which is away from the operating point for which C was measured. Both engine and model were set up at an operating point test point, with the variable n1=84.63%. In this case the U,S and VR matrices fixed in the tracking subroutine were computed from a C matrix which was computed at the different running condition, that at which the test described above was run before (i.e. n1=79.5%). The dP vector of performance parameter changes was input to the engine as before and the tracking model was left to run. The calculated changes in performance parameters in the last column of Table 5 show that the model tracks the engine outputs quite well, indicating that tracking performance is not significantly degraded by moving the engine operating condition away from the condition at which C matrix was measured. It indicates an inherent robustness in the tracking process and it will help to minimise the data storage requirement by enabling an increase in the interval between C measurement points.

TABLE 5

| Parameter | Values elements of dP set in engine | Final values of dPe calculated by tracking system |
| --- | --- | --- |
| eHPC | −0.01 | −0.0149 |
| eHPT | −0.01 | −0.0188 |
| eLPT | 0.0 | −0.0032 |
| eHPT | 0.0 | 0.0054 |
| eLPT | 0.0 | 0.0034 |
| fLPCI | −0.02 | −0.0192 |
| fLPCO | −0.03 | 0.00005 |
| fHPC | −0.025 | −0.0142 |
| fHPT | −0.02 | −0.0184 |
| fLPT | 0.0 | −0.0049 |

The results in general show that linear analysis involving Singular Value Decomposition enables very good estimations of engine performance parameter changes to be calculated. Convergence of model and engine can be enhanced by combining integral feedback action with the Singular Value Decomposition process. There is no restriction to the number of degradation effects which may be included in the analysis. However, the accuracy of estimation of the individual degradation influences depends on the number and nature of the engine sensors used. Depending on the complexity of the system different or additional sensors may be used.

As mentioned C data will vary depending on operating point. In order to enhance the accuracy, the C data may be stored by the tracking model for a plurality of different operating points. Depending on the operating point of the engine, the C data stored for the closest operating point to that of the running engine can be selected and used by the tracking model. Alternatively C data may be ascertained for a particular operating point by interpolation techniques. It would be clear to a person skilled in the art that a reasonable estimation of engine operating point can be obtained from input demand parameter sensor(s).

Another point to note is that in the above example, engine output sensors are distinguished from engine input parameter sensors. In the above example. the latter are used by the model to determine the operating point and thus which C matrix to use, and the output sensors determine the degradation parameters. This should not detract from the generality that both output sensors and input demand parameter sensors come under the general description of engine sensors, all of which provide information for the model to track the system. Input demand parameter sensors could be included as output sensors by the tracking model such that changes therein are included in the dx vector. This would reduce the redundancy in matrix C but limit operating point data used to select the appropriate C data.

Figure 4:
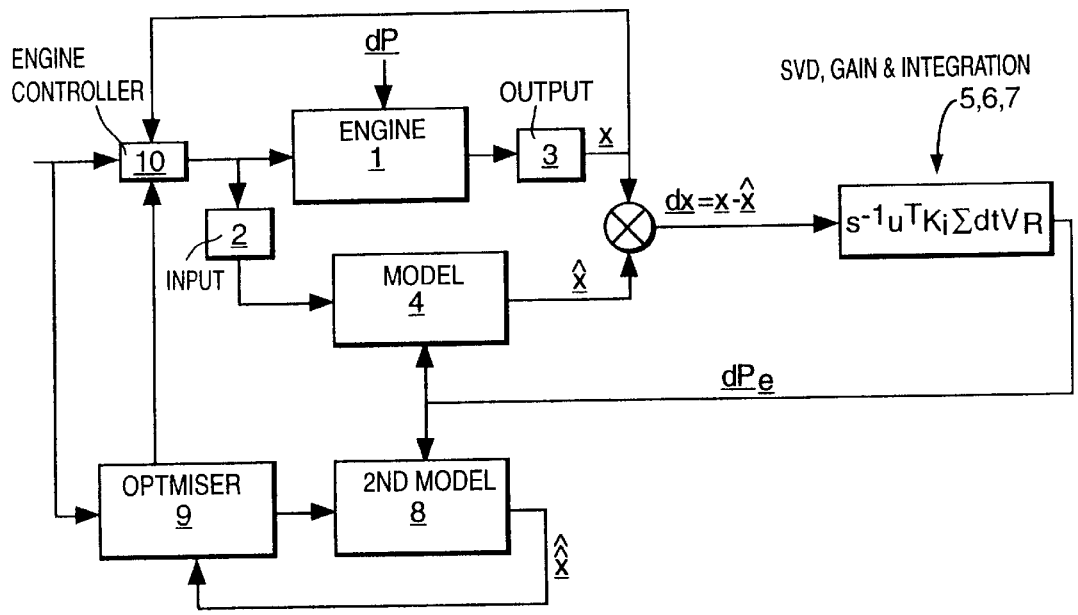
FIG. 4 shows an optimising system incorporating a tracking model used to optimally control an engine.

The main use of the tracking model is to optimise the performance of an engine depending on its particular performance state. An example of an overall optimisation system is depicted FIG. 4. The system comprises a tracking model (4) designed to track a gas turbine engine(1) with output sensors (3) and input demand parameter sensors (2) as described hereinabove. Data from the tracking model is used to provide up to date information for a further second engine model (8) used for optimisation; it is essentially a second model mirroring and kept up to date by the first model. Performance requirements are presented to the engine via the actual engine controller (10) and also to an optimiser (9). These performance requirements (demands) may be categorised as primary and secondary; primary demand is that originating from the airframe e.g. for thrust and the secondary demands are those arising from the need to control engine matching. It is a function of the optimiser to consider performance (demand) requirements and using the model (4) determine the optimum control strategy such that the engine inputs (e.g. actuators) measured by the input demand parameters sensors, are optimally determined within safe limits while meeting the primary requirement; these are then applied to the actual engine controller. This optimisation method has the advantage that it does not disturb engine operation as opposed to direct techniques.

A person skilled in the art of control technology would be able to apply an optimisation algorithm to the second model of the engine (assumed to run in real time) in order to determine optimum input demand parameters which are then to be applied to the real engine through its control system to give optimum performance. Further the optimisation may be multi-mode wherein the performance requirements may differ, allowing the engine to run in its most optimum configuration for each desired mode of operation. These performance requirement modes may be:

a) minimisation of engine specific fuel consumption whilst maintaining thrust at demanded level and observing the structural limitations of the engine; or b) minimisation of engine hot-end temperature whilst maintaining thrust at a set value; or, c) maximisation of engine thrust whilst observing engine structural limitations.

In addition the tracking model may be used for other purposes, notably as a tool to help engine degradation assessment. Performance parameters will indicate the efficiency of a component and thus these data can be used in diagnosis and in determining maintenance schedules.

What is claimed is:

1. A method of monitoring changes in an engine, said method specifically monitoring n performance parameters of said engine by means of n performance parameters changes in the form of a multidimensional vector dP, said engine having a plurality of control inputs and resulting in m engine outputs, where n and m are positive integers with n greater than m, said method comprising the steps of:

(i) providing a computer model of the engine, said model having a plurality of control inputs and having m model outputs;

(ii) initializing said multidimensional vector dP to zero;

(iii) storing at least one non-square matrix C of sensitivity coefficients which relates changes in performance parameters of the engine dP to a vector of differences between engine sensor outputs and computer model outputs dx, where dx=CdP;

(iv) operating said engine;

(v) computing said m model outputs based upon said plurality of control inputs and said vector of performance chances dP;

(vi) comparing said computed m model outputs to m sensor engine outputs and calculating a vector of output sensor changes dx;

(vii) applying singular value decomposition to compute a revised dPe, where $C=US^S:0V^T$ and $V_R(S^S)^{-1}U^T$ is the pseudoinverse of C.

2. The method of monitoring changes in an engine according to claim 1, wherein said step (vii) of applying singular value decomposition comprises the steps of:

(a) operating on the calculated vector of sensor changes dx by $(S^S)^{-1}U^T$ to obtain a vector $\alpha$;

(b) applying a gain factor K to each element of vector $\alpha$ and integrating the resultant signal with respect to time to obtain vector $\beta$;

(c) operating on said vector $\beta$ by matrix $V_R$ to obtain a calculated vector of performance parameter changes dPe.

3. The method of monitoring changes in an engine according to claim 2, further including the step of:

(viii) substituting said calculated vector of performance changes dPe for the previous vector of performance changes in the computer model in step (ii) in order to provide a more accurate performance change vector dPe.

4. The method of monitoring changes in an engine according to claim 2, further including the step of:

(ix) repeating steps (v) through (viii) until a steady state dPe has been achieved.

5. The method of monitoring changes in an engine according to claim 4, wherein in step (iii), matrix C is generated with said engine operating at a given engine operating point.

6. The method of monitoring changes in an engine according to claim 5, wherein in step (iv), said engine is operated away from said given engine operating point.

7. A method of monitoring changes in an engine, said method specifically monitoring n performance parameters of said engine by means of n performance parameters changes in the form of a multidimensional vector dP, said engine having a plurality of control inputs and resulting in m engine outputs, where n and m are positive integers and n is greater than m, said method comprising the steps of:

(i) providing a computer model of the engine, said model having a plurality of control inputs and having m model outputs;

(ii) initializing said multidimensional vector dP to zero;

(iii) storing at least one non-square matrix C of sensitivity coefficients which relates changes in performance parameters of the engine dP to a vector of differences between engine sensor outputs and computer model outputs dx, where dx=CdP;

(iv) operating said engine;

(v) computing said m model outputs based upon said plurality of control inputs and said vector of performance changes dP;

(vi) comparing said computed m model outputs to m sensor engine outputs and calculating a vector of output sensor changes dx;

(vii) applying singular value decomposition to compute a revised dPe, where $C=US^S:0V^T$ and $V_R(S^S)^{-1}U^T$ is the pseudoinverse of C, by the following steps:

(a) operating on the calculated vector of sensor changes dx by $(S^S)^{-1} U^T$ to obtain a vector $\alpha$;

(b) applying a gain factor K to each element of vector $\alpha$ and integrating the resultant signal with respect to time to obtain vector $\beta$;

(c) operating on said vector $\beta$ by matrix $V_R$ to obtain a calculated vector of performance parameter changes dPe;

(viii) substituting said calculated vector of performance changes dPe for the previous vector of performance changes in the computer model in step (ii); and (ix) repeating steps (v) through (viii) until a steady state dPe has been achieved.

8. The method of monitoring changes in an engine according to claim 7, wherein in step (iii), matrix C is generated with said engine operating at a given engine operating point.

9. The method of monitoring changes in an engine according to claim 8, wherein in step (iv), said engine is operated away from said given engine operating point.

* * * * *